C. CASSELL.
ROTARY HARROW.
APPLICATION FILED MAY 8, 1917.

1,240,542.

Patented Sept. 18, 1917.
2 SHEETS—SHEET 1.

C. Cassell
Inventor

Witness

By C. A. Snow & Co.
Attorney

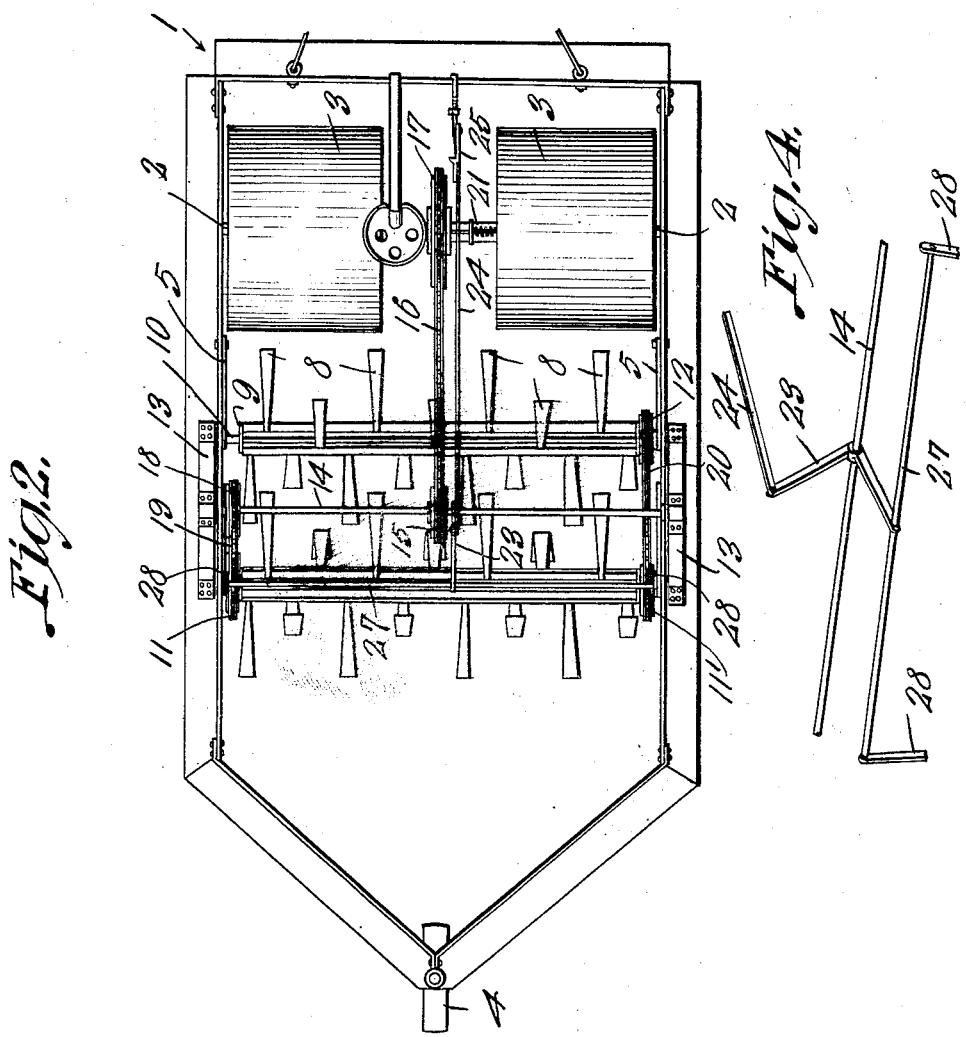

UNITED STATES PATENT OFFICE.

CHARLES CASSELL, OF WEIPPE, IDAHO.

ROTARY HARROW.

1,240,542.   Specification of Letters Patent.   Patented Sept. 18, 1917.

Application filed May 8, 1917. Serial No. 167,198.

*To all whom it may concern:*

Be it known that I, CHARLES CASSELL, a citizen of the United States, residing at Weippe, in the county of Clearwater and State of Idaho, have invented a new and useful Rotary Harrow, of which the following is a specification.

The subject of this invention is a rotary weeder and harrow, and the objects of the invention are, first to provide rotating members formed with teeth adapted to stir up the soil; second, to provide teeth for the rotary member which will have a hoe like action; third, to provide means for raising and lowering the rotary members; fourth, to provide a simple and efficient rotary weeder and harrow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:

Fig. 2 is a plan view of the same.

Fig. 4 is a detail perspective view of a portion of the mechanism for lifting the rotary members.

Figure 1:
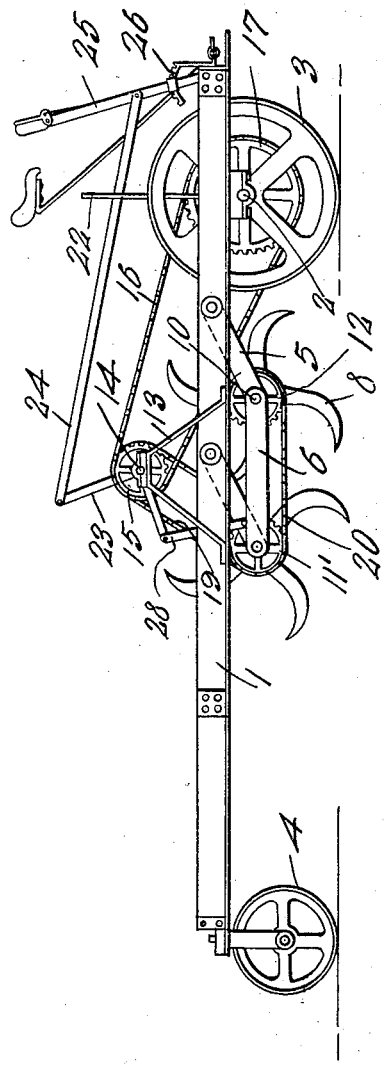
Figure 1 is a side elevation of a harrow constructed in accordance with my invention.
Figure 3:
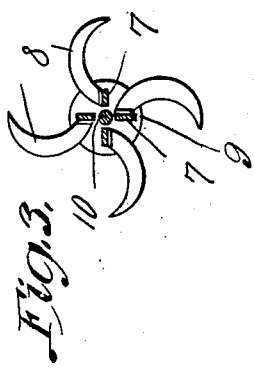
Fig. 3 is a detail cross section of a rotary member.

Referring to the drawings by numerals:

A frame 1, preferably formed as shown, may be made of angle iron or the like. A shaft 2 extends transversely of the frame and is journaled in suitable supports thereon. Wheels 3 are mounted on the shaft 2 and form the main support of the device. A small tracking-wheel 4 is secured to the rear end of the frame as shown.

A pair of links 5—5 is pivotally secured to each side bar of the frame 1 and a connecting rod 6 has its ends pivotally secured to the lower end of each pair of links. Supported by the links 5 and spaced apart by the rods 6 are rotary members which may be of any preferred form but are here shown as reels to the cross arms 7 of which are secured spaced curved teeth 8. The cross arms 7 of these reels are secured to end disks 9 which turn on a shaft 10, the ends of which shaft are secured to and form the pivoting means for the links 5 and connecting rod 6. The rearmost rotary wheel has a sprocket wheel 11—11′ secured to each end thereof, while the forward reel has a sprocket wheel 12 secured to one of its ends.

Secured to and rising from each side bar of the frame 1 is a support 13 which is formed with journaling means for a shaft 14 which extends transversely of the machine and overlies the rotary members. A sprocket wheel 15 is secured on the shaft 14 and is driven by a sprocket chain 16 which passes over a sprocket wheel 17. The sprocket 17 is loosely mounted on the shaft 2. Another sprocket wheel 18 is mounted on the shaft 14 and is connected with the sprocket 11 by a chain 19. A sprocket chain 20 connects the sprocket wheels 11′ and 12 so that, as the shaft 14 is driven the two rotary members are revolved. A suitable clutch indicated at 21 may be provided and thrown by a lever 22 for the purpose of throwing the clutch to rotate the sprocket 17 and operate the device.

A bell crank lever 23 is fulcrumed on the shaft 14 and has one arm pivotally connected to one end of a link 24, the forward end of which link has pivotal connection with a lever 25. A segmental rack 26 is provided with the lever 25 for the purpose of retaining the lever in various positions. The other arm of the bell-crank lever 23 has pivotal connection with a rod 27 which extends transversely of the machine. A link 28 is loosely mounted on each end of the rod 27 and depends therefrom. The lower end of each link 28 is secured to a link 5. This mechanism is operable to raise or lower the rotary members.

In practice the device is used as follows:

Horses or a tractor may be hitched to the harrow in the usual manner. The clutch 21 is thrown in and the device drawn forward. The shaft 14 will be rotated through the sprocket wheels 17 and 15 and the chain 16. Motion will then be imparted from shaft 14 through sprocket 18, chain 19 and sprocket 11 to the rear rotary member. From the rear rotary member motion will be imparted to the forward rotary member through the sprockets 11' and 12 and chain 20. The lever 25 may be operated to adjust the depth of cut of the teeth 8.

Having described my invention, what I claim as new and desire to secure by Letters Patent, is:

1. A weeder and harrow, comprising a wheel supported frame, spaced links pivotally secured to each side of the frame, a connecting rod secured to the pair of links at each side of the frame, reels journaled in the links, curved teeth on the reels, a shaft overlying the reels, gearing between the shaft and the reels and means for rotating the shaft to actuate the reels.

2. A weeder and harrow, comprising a wheel supported frame, links pivotally secured to the frame and depending therefrom, rotary members supported by the links, a shaft journaled in the frame and overlying the rotary members, gearing between the shaft and rotary members, means for rotating the shaft to actuate the rotary members, a bell crank lever fulcrumed on the shaft, a connection between the bell crank lever and the links, and means for operating the bell crank lever to swing the links and adjust the rotary members.

In testimony that I claim the foregoing as my own, I have hereto affixed my signature in the presence of two witnesses.

CHARLES CASSELL.

Witnesses:
J. L. WALKUP,
MARGARET FERMOYLE.

Copies of this patent may be obtained for five cents each, by addressing the "Commissioner of Patents, Washington, D. C."